United States Patent [19]

Kawajiri

[11] Patent Number: 4,799,523

[45] Date of Patent: Jan. 24, 1989

[54] PNEUMATIC RADIAL TIRE FOR MOTOCROSS

[75] Inventor: Junichi Kawajiri, Kodaira, Japan

[73] Assignee: Bridgestone Corporation, Tokyo, Japan

[21] Appl. No.: 58,711

[22] Filed: Jun. 5, 1987

[30] Foreign Application Priority Data

Jun. 26, 1986 [JP] Japan .................... 61-96677[U]

[51] Int. Cl.⁴ .................................... B60C 9/18
[52] U.S. Cl. ............................. 152/535; 152/538
[58] Field of Search ........... 152/535, 526, 538, 528, 152/529, 527

[56] References Cited

U.S. PATENT DOCUMENTS

| | | | |
|---|---|---|---|
| 2,958,359 | 11/1960 | Boussu et al. | 152/535 X |
| 3,664,404 | 5/1972 | Twardzik | 152/538 X |
| 3,949,799 | 4/1976 | Montagne | 152/538 X |
| 4,034,791 | 7/1977 | Mirtain | 152/538 X |
| 4,273,177 | 6/1981 | Nybakken | 152/538 X |
| 4,286,645 | 9/1981 | Boileau | 152/538 X |

FOREIGN PATENT DOCUMENTS 59-53205  3/1984  Japan ........................... 152/535

Primary Examiner—Michael W. Ball
Assistant Examiner—Ramon R. Hoch
Attorney, Agent, or Firm—Sughrue, Mion, Zinn, Macpeak & Seas

[57] ABSTRACT

In a pneumatic radial tire for motocross, since only the central portion of the tread is in contact with a ground in the ordinary travel, a peculiar stress is generated at one end of the belt layer due to the directional relationship between the inclination direction of the outermost belt layer and the tire rotational direction, thus resulting in cracks in the outermost belt. To overcome this problem, the tire is covered with an auxiliary layer of textile cords arranged perpendicular to the belt outer layer cords on one side of the belt where compressive stress is produced, in order to reinforce the belt.

5 Claims, 1 Drawing Sheet

PNEUMATIC RADIAL TIRE FOR MOTOCROSS

BACKGROUND OF THE INVENTION

1. Field of the Invention

The present invention relates to a pneumatic radial tire for motocross, and more specifically to an improvement in belt durability of the pneumatic radial tire for a motocross which travels on unleveled rough ground.

2. Description of the Prior Art

In motocross tires for traveling on unleveled ground, the tire carcass is, in general, of bias structure. In the bias structure carcass, as is well known, the carcass is formed by arranging cords constituting each carcass ply at an inclination angle of 30 to 45 degrees with respect to the tire circumferential direction in such a way that the arranged cords of two adjoining plies are laid one upon another and intersect each other. However, since an excellent traction performance (adhesive friction of a tire on a ground) is strongly required for the motocross tire, recently radial tires provided with excellent traction performance as compared with the bias-structure tires have been put to the practical use.

In the radial tire for motocross, however, it is impossible to increase the bending stiffness at the tire crown portion, because of the peculiarity such that the tire travels on a greatly uneven ground. Therefore, textile cords are preferably used as a belt reinforcing material arranged at the crown portion; and the belt is formed by arranging cords at an inclination angle (e.g. 20 to 35 degrees) smaller than that in the ordinary radial tire with respect to the tire circumferential direction in the same way that the arranged cords of usually two layers are laid one upon another and intersect each other.

In prior art radial tires, however, there still exists a problem with belt durability such that cracks will readily be produced only on one side of the layers due to the directional relationship between the inclination direction of cords of the outermost belt-constituting layer and the rotational direction of the tire. This is because the belt is formed between the carcass and the tread so as to cover the entire tread extending along the round carcass profile in cross section, so that only the central portion of the tread is in contact with ground in the ordinary travel and therefore a peculiar stress is generated at one end of the belt layer in the case of the motocross tire, thus resulting in crack failure.

SUMMARY OF THE INVENTION

With these problems in mind, therefore, it is the primary object of the present invention to provide a pneumatic radial tire for motocross which can prevent cracks from being produced on one side of the belt layers, that is, improve the durability of the belt of the tire.

To achieve the above-mentioned object, a pneumatic radial tire for motocross according to the present invention having (a) a toroidal carcass formed by at least one ply of textile cords arranged substantially in a tire radial direction; and (b) a belt formed by at least two inner and outer layers of textile cords arranged at an inclination angle with respect to a tire circumferential direction so as to reinforce a crown portion of the carcass, cords of the outer layer being laid upon those of the inner layer in intersectional relationship to each other, is characterized in that an auxiliary layer is arranged on one side of the belt outer layer and in that textile cords of said auxiliary layer intersect the textile cords of said belt outer layer.

Further, it is preferable to further provide another auxiliary layer of textile cords arranged on the other side of the belt outer layer.

An inclination angle of the cords of the auxiliary layer is preferably 20 to 35 degrees with respect to the tire circumferential direction. A width of the auxiliary layer is 30 to 50% of that of the belt.

The additional arrangement of the auxiliary layer results from the fact that crack production at the belt is closely related to the relationship between the direction that cords of the outermost belt layer extend and the tire rotating direction. That is, in the radial tire structure such that the cords of the outermost belt layer is inclined at an angle of 20 to 35 degrees with respect to the tire rotating direction, a compressive stress is produced near one end of the belt layer cord on the obtuse angle side (on the left side in FIG. 1) and a tensile stress is produced near the other end of the belt layer cord on the acute angle side (on the right side in FIG. 1), so that cracks will readily be produced on the obtuse angle side due to the compressive stress.

BRIEF DESCRIPTION OF THE DRAWINGS

The features and advantages of the pneumatic radial tire for motocross according to the present invention will be more clearly appreciated from the following description taken in conjunction with the accompanying drawing in which.

DETAILED DESCRIPTION OF THE PREFERRED EMBODIMENTS

Figure 1:
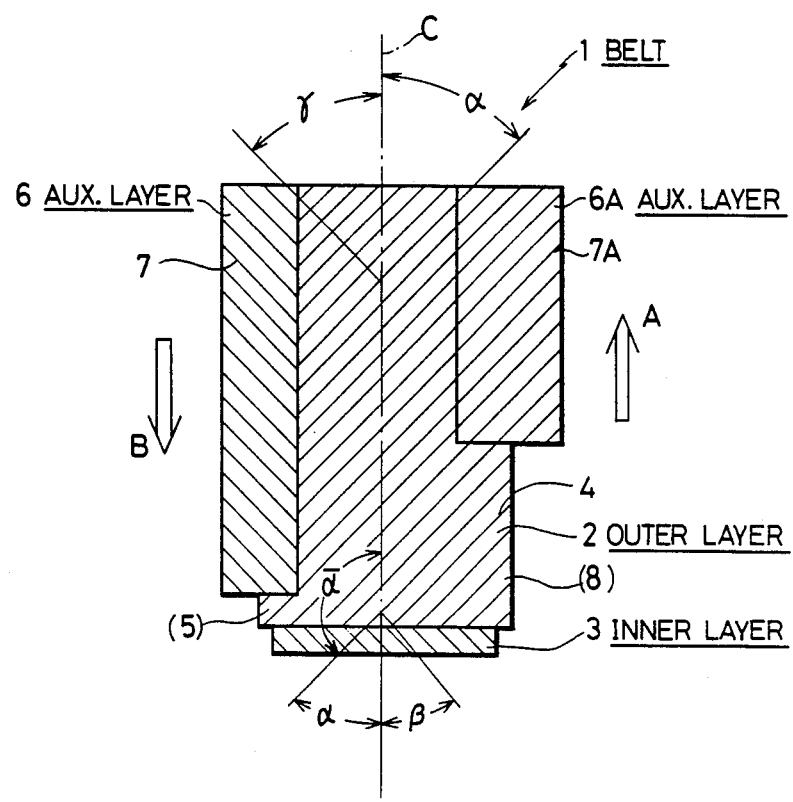
FIG. 1 is a diagrammatical partial expanded view showing belt plies when seen from the outer bottom side of the tire.

FIG. 1 is a bottom expanded view showing the pneumatic radial tire according to the present invention, in which a carcass is omitted. However, the toroidal carcass is formed with at least one ply of textile cords arranged substantially in a tire radial direction.

In the drawing, a belt 1 is made up of a radially outer layer 2 and a radially inner layer 3. The two inner and outer layers 2 and 3 of the belt 1 are arranged at an inclination angle with respect to a tire circumferential direction C so as to reinforce a crown portion of the carcass. Cords 4 of the outer layer 2 are laid upon cords of the inner layer 3 so as to intersect each other.

The arrow A indicates a tire rotational direction, and the arrow B indicates a direction of a reactive force applied from a ground against a tire rotating force, when the tire is assumed to be mounted to a drive wheel of a motorcycle.

In FIG. 1, the left side end (5) of the outer layer 2 (at which an angle subtended by the tire circumferential direction C and the belt outer layer cords 4 is an obtuse angle $\bar{\alpha}$ on the left side in FIG. 1) is directly covered with an auxiliary cord layer 6.

An inclination angle $\gamma$ of the cords 7 of the auxiliary layer 6 from the circumferential direction C on the left side in FIG. 1 is substantially the same as that $\alpha$ of the cords 4 of the outer belt layer 2 from the circumferential direction C on the right side in FIG. 1. The inclination angles $\alpha$ and $\gamma$ both lie preferably within a range of 20 to 35 degrees.

The width of the auxiliary layer 6 for perfectly covering the end (5) of the outermost belt layer 2 is 30 to 50% of that of the belt 1 and preferably about 40% thereof.

Further, when another auxiliary layer 6A is provided on the right side (8) of the outer layer 2 (at which an angle subtended by the tire circumferential direction C and the belt outer layer cords 4 is an acute angle $\alpha$ on the right side in FIG. 1), the inclination angle $\alpha$ of the cords 7A of the auxiliary layer 6A from the circumferential direction C is substantially the same as that $\alpha$ of the cords 4 of the outer belt layer 2. That is, the auxiliary layer cords 7A are in parallel with the outermost layer cords 4 as shown in FIG. 1. The inclination angle $\alpha$ lies preferably within a range of 20 to 35 degrees in the same way.

The width of the auxiliary layer 6A is similarly 30 to 50% of that of the belt 1 and preferably about 40% thereof.

The kind of the textile cord of the layers 2 and 3 and the auxiliary layer 6 or 6A is not necessarily specified. Nylon cord, polyester cord, etc. are available.

In the radial tire according to the present invention, the auxiliary layer 6 provided on the left side (an obtuse angle side) of the belt 1 can reduce compressive stress produced at the belt end at the obtuse angle side, so that it is possible to prevent the generation of cracks. Similarly, the auxiliary layer 6A provided on the right side (an acute angle side) of the belt 1 can reduce tensile stress produced at the belt end at the acute angle side. In this connection, if the inclination angle of the cords 7A of the auxiliary layer 6A provided on the acute angle side is determined to be the same as that of the cords 7 of the auxiliary layer 6 provided on the obtuse angle side, compressive stress will be generated at the axially outward end of the auxiliary layer 6A, so that cracks will be generated at early stages.

EXAMPLES

Tire size: 110/100-18
Carcass: Single nylon (1890d/2) ply of radial structure
Belt 2 and 3: Two nylon (840d/2) layers are arranged at an angle of 27 degrees with respect to the central circumferential line. Belt width is 80 mm in the inner layer and 100 mm in outer layer.
Aux. layer 6: Nylon (840d/2) cords. Width is 40 mm. Inclination angles $\alpha$, $\beta$ and $\gamma$ are all 27 degrees and arranged as shown in FIG. 1.

TEST RESULTS

Tests were made of tires provided with an auxiliary layer 6 on one end (5) of the outermost belt 2 as explained with reference to FIG. 1 and tires for comparison provided with no auxiliary layer. Table 1 shows the test results, in which the effect of the present invention is indicated as an index in comparison with the prior art tires (100). The higher the index is, the higher will be the effect.

|  | Invention Tires | Comparative Tires |
| --- | --- | --- |
| Drum durability | 200 | 100 |
| JATMA drum durability test | Inflation pressure: 2.25 kg/cm$^2$ Load: 280 kg (at 100%) Speed: 80 km/h Drum: 1.7 m-dia. steel drum with a smooth outer surface | |
| | 100% load | 4 hr running |
| | 110 | 6 |
| | 115 | 24 |
| | 125 | 8 |
| | +10% | 8 |
| | : | : |
| | : | : |
| | When the tire is usable after 4-hr travel test under 280 kg (100%) load, the succeeding test step (110% load for 6 hr) is effected, and so on. | |

The test results indicate that the durability of the tires according to the present invention can be improved twice as compared with that of the conventional tires.

What is claimed is:

1. A pneumatic radial tire for motocross comprising:
   a toroidal carcass formed by at least one ply of textile cords arranged substantially in a tire radial direction;
   a belt formed by at least two radially inner and outer layers of textile cords arranged at an inclination angle with respect to a tire circumferential direction so as to reinforce a crown portion of the carcass, cords of the outer layer being laid upon those of the inner layer in intersectional relationship to each other;
   a first auxiliary layer arranged on one side of the belt outer layer in such a way that textile cords of said first auxiliary layer intersect the textile cords of the belt outer layer; and
   a second auxiliary layer arranged on the other side of the belt outer layer in such a way that textile cords of said second auxiliary layer are parallel to the textile cords of the belt outer layer.

2. The pneumatic radial tire for motocross as set forth in claim 1, wherein an inclination angle of the cords of said first auxiliary layer with respect to the tire circumferential direction is in the range of 20 to 35 degrees.

3. The pneumatic radial tire for motocross as set forth in claim 1, wherein a width of said first auxiliary layer is 30 to 50% of that of the outer layer of said belt.

4. The pneumatic radial tire for motocross as set forth in claim 1, wherein the textile cord of said first auxiliary layer is nylon.

5. The pneumatic radial tire for motocross as set forth in claim 1, wherein the textile cord is polyester.

* * * * *